(12) United States Patent
Hartmann et al.

(10) Patent No.: US 11,407,689 B2
(45) Date of Patent: Aug. 9, 2022

(54) BLACK UREA ENHANCED EFFICIENCY CONTROLLABLE RELEASE FERTILIZER COMPOSITIONS

(71) Applicant: BI-EN CORP, Portland, OR (US)

(72) Inventors: Richard O. Hartmann, Portland, OR (US); A. Ray Shirley, Jr., Florence, AL (US)

(73) Assignee: BI-EN CORP, Portland, OR (US)

( * ) Notice: Subject to any disclaimer, the term of this patent is extended or adjusted under 35 U.S.C. 154(b) by 52 days.

(21) Appl. No.: 17/053,685

(22) PCT Filed: May 9, 2019

(86) PCT No.: PCT/US2019/031613
§ 371 (c)(1),
(2) Date: Nov. 6, 2020

(87) PCT Pub. No.: WO2019/217745
PCT Pub. Date: Nov. 14, 2019

(65) Prior Publication Data
US 2021/0070668 A1    Mar. 11, 2021

Related U.S. Application Data

(60) Provisional application No. 62/669,291, filed on May 9, 2018.

(51) Int. Cl.
*C05C 7/02* (2006.01)
*C05C 9/00* (2006.01)
(Continued)

(52) U.S. Cl.
CPC .............. *C05C 7/02* (2013.01); *C05C 7/00* (2013.01); *C05C 9/005* (2013.01); *C05F 11/02* (2013.01); *C05G 5/12* (2020.02); *C05G 5/35* (2020.02)

(58) Field of Classification Search
None
See application file for complete search history.

(56) References Cited

U.S. PATENT DOCUMENTS

| | | | |
|---|---|---|---|
| 3,576,613 A | 7/1971 | Fleming | |
| 6,576,035 B2 * | 6/2003 | Hartmann | C05G 5/30 71/64.02 |
| 2014/0311200 A1 * | 10/2014 | Hartmann | C05D 3/02 71/21 |

FOREIGN PATENT DOCUMENTS

| | | |
|---|---|---|
| WO | 2001042170 A1 | 6/2001 |
| WO | 2013/082485 A2 | 6/2013 |
| WO | 2019/217745 A1 | 11/2019 |

OTHER PUBLICATIONS

Patent Cooperation Treaty: International Preliminary Report on Patentability for PCT/US2019/031613 dated Nov. 19, 2020; 7 pages.
(Continued)

*Primary Examiner* — Wayne A Langel
(74) *Attorney, Agent, or Firm* — Schwabe, Williamson & Wyatt, PC (57) ABSTRACT

Calcium cyanamide fertilizer compositions and methods for their use are disclosed. The compositions and methods stabilize active ionic compositions comprising calcium cyanamide and enhance the effectiveness of calcium cyanamide alone or synergistically in combination with nitrogen containing materials such as urea and organics, for example, manures. The compositions and methods also facilitate controllable site directed delivery of the contents of the stabilized compositions. The compositions and methods are effective for fertilizing, soil amending, metal stabilizing and odor and organism inhibition. The compositions are stable, easily calibrated, and non-clogging for spray delivery to target sites.

28 Claims, 4 Drawing Sheets

(51) Int. Cl.
*C05F 11/02* (2006.01)
*C05C 7/00* (2006.01)
*C05G 5/35* (2020.01)
*C05G 5/12* (2020.01)

(56) References Cited

OTHER PUBLICATIONS

Patent Cooperation Treaty: International Search Report and Written Opinion for PCT/US2019/031613 dated Jul. 19, 2019; 11 pages.

* cited by examiner

RIGHT HULAS STABL-U™ FERTILIZED VERY PROFUSE SEEDS -

FIG. 4

BLACK UREA ENHANCED EFFICIENCY CONTROLLABLE RELEASE FERTILIZER COMPOSITIONS

CROSS-REFERENCE TO RELATED APPLICATION

This application is a national phase entry under 35 U.S.C. § 371 of International Application No. PCT/US2019/031613, filed May 9, 2019, which designates the United States of America, which claims priority to U.S. Provisional Application No. 62/669,291, filed May 9, 2018, the entire disclosures of each of these applications are hereby incorporated by reference in their entireties and for all purposes.

FIELD

The present application concerns compositions that include urea, calcium cyanamide, and carbon black and methods for their use including, without limitation, in industry and farming, decomposition (composting), odor and organism inhibition, nutrient stabilization, fertilizing and soil amending.

BACKGROUND

Calcium cyanamide (for example, sold as Calzot™) is a chemical compound used in industrial agricultural fertilizers. The fertilizer calcium cyanamide helps plants to reach high yields, thus maximizing profits for farmers. The chemical is applied directly to the soil, where it breaks down into components that are beneficial to plant growth. Calcium cyanamide also functions in other facets in addition to being a fertilizer. Calcium cyanamide's primary function is that of a fertilizer in industrial agriculture settings. It is not typically used in home gardens. The chemical enriches the soil with beneficial lime and, upon coming into contact with water, begins to break down, releasing nitrogen into the soil by way of ammonium.

SUMMARY

Disclosed herein is a granular material, such as a homogenously mixed granular material. The granular material includes about 0.1 to about 1.1% of the total weight as carbon black powder, about 0.1 to about 40% of the total weight as calcium cyanamide, and about 60 to about 99.9 percent of the total weight as urea.

In embodiments, the granular material further includes at least one additional nitrogen containing material. In various examples, the at least one additional nitrogen containing material is an ammonium salt. In examples, the ammonium salt is selected from the group consisting of ammonium sulfate, ammonium chloride, ammonium monophosphate, ammonium diphosphate, ammonium citrate, ammonium nitrate, calcium ammonium phosphate, and mixtures thereof.

In embodiments, the granular material further includes at least one non-nitrogen plant nutrient. In examples, the non-nitrogen plant nutrient is selected from the group consisting of phosphorous, potassium, iron, copper, zinc, manganese, boron, magnesium, molybdenum, sulfur, and mixtures thereof.

In embodiments, the granular material further includes at least one nitrogen containing compound selected from the group consisting of ammonium sulfate, ammonium chloride, ammonium monophosphate, ammonium diphosphate, ammonium citrate, ammonium nitrate, calcium ammonium phosphate, and mixtures thereof and at least one non-nitrogen plant nutrient selected from the group consisting of phosphorous, potassium, iron, copper, zinc, manganese, boron, magnesium, molybdenum, sulfur, and mixtures thereof.

Disclosed is a method for making a homogeneous solid composition. The method includes: dissolving urea in water, to create a urea and water solution; adding carbon black powder to the urea and water solution; combining calcium cyanamide with the urea and water solution where the amount of water in the solution is at least 14 times the weight of the dry calcium cyanamide; and dehydrating the solution to form a solid. In embodiments, the water is saturated with urea. In embodiments, the solution is a slurry. In certain embodiments, the method includes inhibiting the aeration of the solution. In specific examples, inhibiting aeration includes combining and dehydrating within a container that inhibits exchange of gases with the atmosphere. In specific examples, the container is sealed to substantially prevent exchange of gases with the atmosphere. In specific examples, the container is evacuated to inhibit exchange of gases with the atmosphere. In specific examples, inhibiting aeration includes combining and granulating in the presence of a gas that serves to substantially exclude the atmosphere. In examples, the gas is selected from the group consisting of nitrogen, ammonia, argon, and mixtures thereof. In certain embodiments, at least one additional nitrogen containing compound is included in the solution. In certain embodiments, at least one additional non-nitrogen plant nutrient is included in the solution.

Disclosed is a method for making a solid composition. The method includes: providing a calcium cyanamide core; coating the calcium cyanamide core with urea to form a calcium cyanamide core with a urea shell; and coating the urea shell with a carbon black shell. In embodiments, coating the calcium cyanamide core with urea, comprises: dissolving urea in water, to create a urea and water solution; and allowing the urea to harden around the calcium cyanamide core. In embodiments, allowing the urea harden comprises dehydrating the urea. In embodiments, coating the urea shell with a carbon black shell, comprises: combining carbon black powder with a urea and water solution; and allowing the carbon black powder urea and water solution to harden around the urea shell. In embodiments, allowing the carbon black powder urea and water solution to harden comprises dehydrating the solution. In embodiments, the method further comprises including at least one additional nitrogen containing compound in the solid composition. In embodiments, the method further comprises including at least one additional non-nitrogen plant nutrient is included in the solution.

Also disclosed is a method for providing nutrients to plants. In embodiments, the method includes: providing a disclosed granular composition; adding water to the granular composition to form an aqueous composition; and applying the aqueous composition to plants, thereby providing nutrients to plants.

Also disclosed is a method for enhancing plant growth. In embodiments, the method includes: providing the granular composition; adding water to the granular composition to form an aqueous composition; and applying the aqueous composition to enhance plant growth.

The foregoing and other objects, features, and advantages of the invention will become more apparent from the following detailed description of several embodiments, which proceeds with reference to the accompanying figures. The inclusion of particular embodiments in this Summary, does not imply that they are essential to the invention.

DETAILED DESCRIPTION

Introduction

Commercial calcium cyanamide (CaNCN) is a mixture of several components formed during or remaining after production of the desired calcium cyanamide compound. Additional components found in commercial calcium cyanamide include calcium oxide (CaO), calcium carbide ($CaC_2$) and oxides of iron, aluminum, and silicon. Additional information regarding calcium cyanamide can be found in U.S. Pat. No. 6,576,035, which is specifically incorporated herein in its entirety.

Typically, commercial calcium cyanamide is treated to alter the form of cyanamide or remove components remaining after manufacture. For example, because calcium cyanamide is a slow acting fertilizer that is sparingly soluble in water, it is often factory converted to water-soluble molecular cyanamide ($H_2NCN$) which is faster acting and a higher analysis source of nitrogen. In this process, calcium cyanamide is forced to dissolve in water by precipitation of calcium ions ($Ca^{2+}$) as calcium carbonate ($CaCO_3$) and by acidification to convert initially formed cyanamide ions ($NCN^{2-}$) into acid cyanamide ion ($HNCN^-$) and then into molecular cyanamide, which predominates at a pH of 4.5-5.5.

Calcium ions ($Ca^{2+}$) are present in most organic matter and are necessary for many enzymatic reactions, including those that facilitate energy use by living organisms. Furthermore, calcium ions aid in soil reclamation by acting to flocculate soil and permit water percolation. Additionally, calcium tends to enhance the breakdown of organic matter through these and other actions.

While calcium ions are abundant in nature in the form of limestone (calcium carbonate, $CaCO_3$), they are not readily available for uptake because of the relative insolubility of calcium carbonate. From this is seen the need to stabilize calcium ions in soluble form to enhance the speed of calcium uptake into organic matter, both living and dead, to aid plant growth and soil reclamation.

Calcium cyanamide is a potential source of stabilized $Ca^{2+}$ that can rapidly enter plants and flocculate soil. It is therefore desirable to stabilize and deliver the calcium component of calcium cyanamide for decomposition (composting) enhancement, odor and organism inhibition, plant nutrition, and soil flocculation.

Nitrogen, in its molecular form ($N_2$) comprises approximately 78% of the earth's atmosphere. Nitrogen is a component of all proteinaceous matter found in living organisms, but only a few organisms (such as nitrogen-fixing bacteria) are able to directly capture atmospheric nitrogen and add it to the biosphere.

Proteinaceous matter, contained in dead and decaying organic matter and additionally in the excreta of animals represents a vast potential source of nitrogen for growth of living organisms. However, in proteinaceous form, nitrogen is insoluble and unavailable to living organisms except through the action of decomposers, which release nitrogen in the forms $NH_3$, $NH_4^+$, $NO_2^-$, and $NO_3^-$. These forms can be utilized by plants and allow nitrogen to reenter the living biosphere.

In many instances the rate at which nitrogen becomes available from decomposing (composting) organic matter is insufficient to provide rates of plant growth that are desired by modern agriculture. Thus, there arises a need to supplement available nitrogen in soil and/or increase the rate at which nitrogen becomes available to plants from decomposing organic matter.

Modern agriculture has chosen to pursue a strategy of supplementing plant available nitrogen through the use of high analysis nitrogen fertilizers, such as inexpensive urea, ammonia, ammonium compounds, and nitrates. Concurrently, use of calcium cyanamide, the first commercially available high analysis fertilizer, has declined due to the high cost of its manufacture and to the handling, shipping, and phytotoxicity problems it poses.

While high analysis nitrogen fertilizers can provide abundant nitrogen for rapidly growing plants, their use has produced some undesirable consequences, such as leaching of nitrates into groundwater and losses of volatile ammonia to the atmosphere. These are also problems associated with composting and applying animal excreta directly to soils. Thus, it is desirable to provide compositions and methods that promote release of nitrogen from proteinaceous materials, yet slow its loss to the atmosphere and from soil. It is also desirable to provide compositions and methods that stabilize and extend the residence time of high nitrogen analysis fertilizers in the plant root zone.

Plants deficient in calcium but provided with an abundance of nitrogen are prone to parasitic organisms. Conversely, plants with high ratios of calcium to nitrogen resist parasitic organisms. It is also known that it is difficult to provide plants with calcium in direct proportion to the rate at which they can absorb soluble nitrogen forms, even if calcium and nitrogen are provided as water-soluble calcium nitrate ($CaNO_3$). Slow acting calcium sprays and expensive chelated forms of calcium have been reported not to cure calcium deficiencies observed during intensive nitrogen demanding vegetable production in California (Crop Notes, UC Extension, Salinas, Calif., July 2000). Therefore, it would be desirable to have compositions and methods that stabilize soluble calcium and promote calcium uptake by plants in proportion to nitrogen uptake, thereby conferring parasite resistance to the plants.

Calcium cyanamide which comprises 44% calcium and 24% nitrogen was first made in the late 1800s, as part of a search for a high analysis nitrogen source for industry and agriculture to replace low analysis (1-<12%) excreta deposits. It is produced in 1000 to >3,000° C. electric arc furnaces by burning black coal and white limestone in the presence of atmospheric nitrogen. Energy costs represent the bulk of the cost of production of calcium cyanamide.

Because calcium cyanamide is slow acting, one application at a rate of 1000 to 2000 lbs/acre lasts all growing season long. However, when calcium cyanamide is applied at these typical season long rates, particularly in cool and or dry conditions, it is necessary to delay planting until the high concentrations of plant penetrating initial hydrolysis products of calcium cyanamide, which are toxic to seeds and seedlings (phytotoxic), dissipate. Furthermore, because calcium cyanamide in its noxiously dusty irregular granule form is difficult to calibrate, its application may be haphazard so that one part of a field may be ready for planting while others exhibit persistent phytotoxicity. The phytotoxic characteristics of calcium cyanamide also make even repeated dry applications at lower rates impractical.

The observation that calcium cyanamide exhibits phytotoxicity led to its use as a herbicide. However, its use as a herbicide has largely been dropped in favor of modern herbicides.

For the reasons above, use of dry calcium cyanamide has decreased and presently, it is no longer used in the United States. Worldwide, its use is largely restricted to rice cultivation, where hot, wet conditions quickly degrade and remove other nitrogen fertilizers, such as urea, from the soil.

Calcium cyanamide is more typically converted to faster acting and higher analysis forms of nitrogen. For example, calcium cyanamide may be aerobically hydrolyzed in the presence of carbon dioxide to provide calcium free urea (42% N). Other high analysis nitrogen forms which are produced from calcium cyanamide include calcium free, dicyandiamide (($HNCN$)$_2$, 66% N) and molecular cyanamide ($H_2NCN$, 66% N). These forms have found use in both agriculture and the production of many of today's industrial polymer chemicals and medicines. However, plant beneficial calcium is not a part of these products.

It would be a benefit to provide compositions and methods that exploit the slow acting nature of calcium cyanamide yet provide immediately available plant nitrogen without phytotoxic consequences. It would also be a benefit if such compositions and methods made it easier to calibrate applications of calcium cyanamide and facilitated repeated smaller applications throughout the growing season. Furthermore, it would be an advantage if these benefits were achieved at more economical rates of application and enabled more of the components that exist in commercial calcium cyanamide to be utilized.

Carbon black (subtypes are, channel black, furnace black, lamp black thermal black, and carbon black in the form of biochar) is a material produced by the incomplete combustion of heavy petroleum products such as FCC tar, coal tar, ethylene cracking tar, with the addition of a small amount of vegetable oil. Carbon black is a form of paracrystalline carbon that has a high surface-area-to-volume ratio, albeit lower than that of activated carbon. It is dissimilar to soot in its much higher surface-area-to-volume ratio and significantly lower (negligible and non-bioavailable) PAH (polycyclic aromatic hydrocarbon) content. It is believed that the added carbon black feeds in soil beneficial microbes, for example microbes beneficial for plants and plant growth.

Urea, today, is made in approximately 75 factories worldwide with a total capacity approaching 200,000,000 tons annually. Dry, water-soluble urea is a low cost, fast acting, and easily calibrated soluble nitrogen form. However, urea is recognized to undergo rapid hydrolysis, which may lead to ammonia gas release and/or losses due to nitrate leaching. Urea and excreta hydrolysis also contribute large amounts of the greenhouse gas $CO_2$. In fact, urea and decomposed proteinaceous animal excreta containing urea are now considered so environmentally threatening that farmers using such fertilizers have already been subject to fines and judgments ($30,000 to $300,000) for violation of clean water laws that regulate nitrates. It would therefore be desirable to provide compositions and methods that allow urea and animal excreta to be utilized as fertilizers without ammonia loss or rapid leaching of nitrates.

While calcium cyanamide is believed to function as both a urease and nitrification inhibitor, direct addition of calcium cyanamide to urea is warned against because the residual calcium oxide in commercial calcium cyanamide promotes ammonia volatilization, especially under wet conditions (Nianzu et al., Fertilizer Research, 41: 19-26, 1995).

What is need therefore are compositions and methods that make it possible to take advantage of calcium cyanamide's potential to mitigate nitrate leaching following application of urea. Furthermore, it would be advantageous to provide compositions and methods that make it possible to combine commercial calcium cyanamide directly with urea, even in wet conditions, and preserve the calcium oxide component of the calcium cyanamide and/or its water dissolution products.

When calcium cyanamide first dissolves in water it produces calcium ions ($Ca^{2+}$) and cyanamide ions ($NCN^{2-}$) as products. The cyanamide ion is very basic and reacts with water to form the acid cyanamide ion ($HNCN^-$). The acid cyanamide ion is amphoteric, i.e. it can act as either an acid or a base. If the acid cyanamide ion acts as an acid it will revert to the cyanamide ion and if it acts as a base it will react to form molecular cyanamide ($H_2NCN$). The form that cyanamide takes in solution will depend upon the pH of the solution, but molecular cyanamide is favored at pH's below 10.3, which are typical of soils. Molecular cyanamide may then undergo hydrolysis to form urea, which may further react to form ammonium ions, which may further be converted to volatile ammonia or to nitrate.

As stated previously, the acid cyanamide ion is plant and organism penetrating. Once absorbed by plants, the acid cyanamide ion lasts only 2-4 hours before it forms urea, which lasts 4-8 hours. Both acid cyanamide and urea stimulate arginine production in plants, however, cyanamide stimulates arginine production 20 times more effectively than urea. Arginine production is related to activation of both plant reproductive responses and disease and pest resistance in plants. Such activation is termed "Systemically Activated Resistance" or SAR (see for example, Kunz et. al., *Zeitschrift fur Plantzen Krankheiten und Flanzenschutz*, 61: 481-521, 1954; Lovatt et. al., *Proceedings California Plant and Soil Conference* 1992 & 1995; Wunsch et. al., *Zeitshrift fur Pflanzenphysiology*, 72: 359-366, 1974; and Von Fishbeck et. al., *Zeitschrift fur Planzen Krankheiten*, 71: 24-34, 1964). Therefore, compositions and methods that stabilize and provide acid cyanamide ions to plants over long periods of time are desirable for producing fruitful, parasite free plants.

When CaNCN is applied at fertilizer rates, atop warm, wet soil, rapid uncontrollable aerobic hydrolysis occurs, moving initially soluble calcium to insoluble calcium forms and cyanamide ions to urea, then gaseous ammonia at that location. A need is thus seen to economically stabilize initial pre-hydrolysis soluble acid cyanamide ions and calcium ions in high dilutions so that they can rapidly percolate to target sites of choice where the ions can be absorbed by plants and aid in maintaining soil porosity.

Calcium oxide, a by-product of calcium cyanamide production, is considered a nuisance for at least two reasons. First, calcium oxide readily absorbs carbon dioxide from the atmosphere to form calcium carbonate. Calcium carbonate, has a density that is lower than calcium oxide and therefore occupies more space than the calcium oxide from which it forms. When calcium oxide reacts to form calcium carbonate within particles of commercial calcium cyanamide, the result is an expansion that leads to cracking and noxious dusting of the calcium cyanamide product. Second, calcium oxide reacts with water to form calcium hydroxide, a strong base. During production of molecular cyanamide from calcium cyanamide, the calcium oxide component of the commercial calcium cyanamide product makes it necessary to add additional acid to lower the pH to 4.5-5.5, thus adding expense to the molecular cyanamide product.

As discussed previously, calcium oxide is also a potential source of calcium ions from commercial calcium cyanamide. Therefore, it is desirable to preserve the soluble calcium that is contained in the calcium oxide. Furthermore, as also discussed above, it is advantageous to prevent production of insoluble calcium carbonate from calcium oxide if spray application of calcium cyanamide is desired.

In recent years odorous "greenhouse gas" emissions, coliform bacteria, leachable nitrogen, and phosphate from concentrated animal feeding operations has become an environmental concern, both in the US and the throughout the world. Such concerns have prompted US Federal, State, and world-wide funding of inspections of livestock operations for compliance with herd size and odor, disease and water nutrient level mitigation measures. For example, in the Netherlands, animal operations must account for and balance every single unit of input with output units. Aerobic composting that wastefully releases nitrogen and carbon into the atmosphere and storage of animal wastes in vast aerobic, odorous lagoons still remain the principal available mitigation measures short of reducing herd size and suffering negative economic consequences.

Thus, there appears a vast urgent need to provide an economical, practical and rapid, non-gas releasing, composting alternative to animal feeding sites. Such an alternative method of composting would desirably reduce the odor and disease causing organisms associated with animal wastes while resulting in a fertilizer composition that contains stabilized nutrients, which promote sustained growth and parasite resistance in plants and serve as effective soil amendments.

Metals are an essential to life. However, metals are increasingly being leached below plant root zones due to the increased use of soluble, acid forming nitrogen plant foods. One solution to this problem is to apply lime to soils because many metals are less likely to leach from soils of higher pH. Lime, albeit inexpensive, requires tons per acre and considerable application expenses to achieve modest increases in soil pH. As explained earlier, lime is virtually insoluble, thus slow to release soluble calcium and pH increasing carbonate ions. Thus, lime only slowly raises soil pH, especially at depth in the soil where it is desired to immobilize metals near plant roots so that they are available to the plants. What are needed are compositions and methods that can supply metal micro-nutrients quickly to plant root zones and stabilize them in the root zone by raising the pH of the soil at depth. Because commercial calcium cyanamide contains approximately 2% oxides of the elements iron, silicon, and aluminum, it would also be advantageous to make use of calcium cyanamide as a source of these micro-nutrients while simultaneously providing for their stabilization in the soil.

Carbon dioxide and catalytic converter metal deposits from auto exhausts are apparently resulting in metal leaching into groundwater along roadsides. Acidic conditions develop along roadsides through carbon dioxide dissolution in rain water and decomposition of plant matter. These conditions foster leaching of deposited metals, some of which are toxic. For example, although lead is no longer a component of most gasoline products, lead contamination remains a problem where high concentrations of the metal were deposited in the past. Thus, there is a need to slow or prevent leaching of metals from soils along roadsides. Again, application of lime is one possible solution, but what are needed are compositions and methods that can provide metal stabilization in soils without the limitations of lime discussed previously.

The disclosed methods and compositions are related to the discovery that the components normally present in commercial calcium cyanamide, urea, and carbon black, may be exploited to provide fertilizing and soil amending materials that are controllably stabilized and exhibit enhanced efficiency at surprisingly low rates of application. When urea and carbon black are combined with calcium cyanamide according to the disclosure, co-activation and stabilization occurs, providing synergistic responses from the carbon black, the urea, and the calcium cyanamide.

The disclosed compositions and methods provide for stabilization and enhanced persistence and efficiency of nitrogen fertilizers such as urea. Urea combined with calcium cyanamide according to the disclosure, appear to assist dissolution of calcium cyanamide and further preserve its initial hydrolysis products, especially when aeration is inhibited. Synergistically, the initial hydrolysis products of calcium cyanamide appear to facilitate transport of nitrogen fertilizers to plant root zones and extend their residence time in the soil. In the case of animal excreta, odor and disease causing microorganisms are inhibited as well. Thus, urea and carbon black become value-added fertilizers when combined with calcium cyanamide according to the disclosure. In certain embodiments, the calcium cyanamid is hydrolyzed, it results in the carbon being rendered "colloidal" and fine, for example able to pass through a 1,500 screen.

Accordingly, one overall objective is to free, then stabilize calcium cyanamide's components in ionic and soluble form so that they may be used together simultaneously. The disclosed compositions and methods make it possible to rapidly and fully activate all the components initially available from difficult to wet and slow to fully water activate (much like cocoa in milk), commercial calcium cyanamide. Not only are the components activated, they may be instantly and indefinitely stabilized, rather than being volatilized to air, allowed to further convert to secondary less chemically and bioactive soluble forms, or precipitate from solution, in a highly active ionic tea for novel beneficial responses.

For example, disclosed are methods of activating and sealing to stabilize soluble calcium ions initially freed from calcium cyanamide, calcium carbide and calcium oxide. Active, soluble calcium ions present in or generated by the disclosed compositions and methods provide for rapid soil amendment and decomposition of (composting of) organic matter. The compositions and methods further function stabilize the initial high pH state that results as calcium cyanamide dissolves and reacts with water. The preserved high pH stabilizes the chemically and bioactive acid cyanamide ion. Furthermore, the resultant preserved high pH state obtained from the compositions and by the methods of the disclosure stabilizes, in less mobile form, otherwise leachable micronutrients such as iron, silicon and aluminum that are present in commercial calcium cyanamide. An added benefit is that beneficial and toxic metals already present in soils may be stabilized because the high pH state is effectively transferred to the soil at depth by the compositions and methods. According to the disclosed methods and compositions, soil and plant valuable fine carbon from commercial calcium cyanamide is stabilized and prevented from precipitating as insoluble calcium carbonate.

An unexpected benefit of combining an excess of molten urea with carbon black and calcium cyanamide is that partial dissolution and hydrolysis of calcium cyanamide components appear to occur. Again, the moisture content of molten urea is believed to be responsible. Partial dissolution transforms otherwise hard to dissolve, non-uniform, noxiously dusty co-melted fines or core granules of dry calcium cyanamide into rapidly activated and stable sources of the initial dissolution and hydrolysis products of calcium cyanamide. Activation of calcium cyanamide during production of the solid compositions of the disclosure is evidenced by the presence in some embodiments of a microscopically visible homogeneous react zone at the interface between calcium cyanamide, urea, and carbon black. Visible co-mingling between urea, carbon black, and calcium cyanamide phases suggests some type of reaction is occurring. Novel activation and preservation of calcium cyanamide by an excess of molten urea is also suggested by the dramatically increased cyanamide yields observed for the heterogeneous solid composition of the disclosure. It is possible to gases, for example inert gases, to a container to inhibit aeration. When using an external source of gas pressure, it is also possible to maintain the preserved, aeration inhibited state even during sealed vessel draining by making use of added gas pressure to expel the contents of the vessel. This facilitates direct delivery of highly active aqueous calcium cyanamide compositions to target sites, even without filtering, as delivery apparatuses are not plugged by the finely divided carbon slurries that are preserved by inhibiting aeration of aqueous calcium cyanamide compositions. Furthermore such aqueous compositions may be readily diluted and delivered with full effect by injection into high volumes of water such as non-aerated sprays or irrigation waters that also appear to buffer and preserve the beneficial soluble components of calcium cyanamide.

One of the benefits of the disclosed combinations of calcium cyanamide, carbon black and urea is the ionic nutrients are released in a higher yields, which means that less material need be used per acre of cultivation, for example 25% or less. Application of the formulations also may result in healthier pest resistant plants, e.g. Systemic Activated Resistance (SAR), and a reduction in herbicides needed. Ionized urea to ammonia composts residual in-soil protein refuse, including weed seeds. The addition of carbon black feeds good soil microbes that feed earth worms, potentially increasing their yield by 300%. The carbon fed more microbes captures and consumes otherwise leachable nitrate nitrogen. Furthermore, Delivery of urea and stabilized ionic compositions comprising calcium cyanamide to roots according to the disclosure also appears to be an effective method of stimulating arginine production in plants. Arginine production is associated with systemically activated resistance (SAR) in plants. Activated reproductive development, fruiting, and parasite resistance observed for plants treated with stabilized calcium cyanamide ionic compositions indicate that the methods and compositions of the disclosure are effective in stimulating SAR in plants. It appears that deep in soil, urea acts to stabilize acid cyanamide ions (which are very effective in stimulating plant arginine) and that conversely urea is stabilized in its dissolved state so that it does and not lose its $CO_2$ component (also believed to activate arginine to a lesser extent). Surprisingly low rates of application (e.g., about 1-10 lbs/acre) of calcium cyanamide are very effective in eliciting apparent SAR effects in plants when stabilized calcium cyanamide ions are provided in low calcium cyanamide/urea/carbon black ratio compositions according to the disclosure.

Perhaps one of the most surprising discoveries of the disclosure is that no non-contributing additives (in the sense that they do not act as plant nutrients) or unusual methods are required to obtain the desirable composition qualities according to the disclosure. Rather, it appears that the components of the disclosed compositions contributed from commercial calcium cyanamide alone or in combination with nitrogen containing materials such as urea and carbon black are sufficient to provide for self-stabilization. Furthermore, the disclosed compositions and methods provide enhanced efficiency of each of their components in a synergistic fashion not otherwise achievable. An additional unexpectedly superior property of the subject compositions is that CaNCN hydrolysis puts hydrolyzed safe urea to toxic anhydrous $NH_3$ for all the work. Even dry black urea into irrigation water makes harmless ammonium $NH_4^+$. It was found dried-out soil it's harmful phytotoxic $NH_3$ and could potentially replace all farm pesticides. The loss of hydrogen from dry out creates very high pH which is antagonistic to desired and undesired plants/organisms.

The stabilized liquid state according to discoveries in this disclosure can be achieved by inhibiting aeration of the water mixed components. Surprisingly, it has been discovered that dissolution of calcium cyanamide in water provides a self-stabilizing, highly active cocktail of ions. Self-stabilization is believed to be due in part to the calcium carbide component of commercial calcium cyanamide.

Aeration of aqueous calcium cyanamide compositions may be further inhibited by mixing calcium cyanamide with water that is partially or completely saturated with solubles that act to buffer out $CO_2$. For example, urea and soluble species generated by composting manures with small amounts (e.g., 0.01 to 5% by weight) of calcium cyanamide according the disclosure appear to exclude atmospheric carbon dioxide from aqueous compositions. Furthermore, the inhibition of aeration by urea and other solubles appears to be maintained even as the liquid compositions percolate into soils. Inhibition of aeration is also believed to partly explain the unexpected properties exhibited by the solid compositions of the disclosure. In the case of heterogeneous compositions that comprise a calcium cyanamide core and a urea coating, it is plausible that purging atmospheric gases including carbon dioxide from the near the core. As urea cools and solidifies around the core it is sealed from further exposure to atmospheric gases.

The effect of inhibiting aeration on the stability of aqueous calcium cyanamide compositions may be understood by recognizing that calcium ions combined with dissolved carbonate ions ($CO_3^{2-}$) will precipitate as calcium carbonate ($CaCO_3$). Carbonate ions, which may be formed through the dissolution of carbon dioxide from the atmosphere, are depleted by precipitation with calcium ions. In order to maintain equilibrium with the atmosphere, the solution will absorb carbon dioxide to replace the carbonate ions. As seen in the scheme above, carbonate ions are not formed directly from carbon dioxide, but rather are formed from carbonic acid ($H_2CO_3$) that results when water and carbon dioxide react. Carbonate ions are available only after carbonic acid has lost it two protons. These protons will be neutralized by available hydroxide ions and as hydroxide ions are neutralized, the pH drops. Thus, it may be seen that preventing additional carbon dioxide from dissolving in aqueous calcium cyanamide compositions will maintain the high pH initially obtained.

If the pH of an aqueous calcium cyanamide composition drops significantly below 10.3, molecular cyanamide ($H_2NCN$) will predominate. As can be seen from the bottom set of reactions in the scheme above, molecular cyanamide is one step closer to urea [$CO(NH_2)_2$] than the acid cyanamide ion. Hydrolysis of molecular cyanamide to urea may then be followed by rapid conversion to ammonium ($NH_4^+$) and nitrate ($NO_3^-$) which may be lost from soils by volatilization and leaching respectively.

The synergistic stabilization of nitrogen containing material and calcium cyanamide by the methods and compositions of the disclosure may be understood by considering what effects each may have upon the other, especially when aeration is inhibited. Since acid cyanamide ions are believed to function as urease and nitrification inhibitors they will tend to prevent conversion of urea to ammonia and nitrate. Stabilization of the high pH state according to the disclosure provides a stable solution containing acid cyanamide ions. Thus, because acid cyanamide ions appear to prevent loss of urea, fewer acid cyanamide ions will be converted to urea in order to maintain equilibrium in the system. Furthermore, if urea or other nitrogen containing material that provides urea is added, especially in excess, at least two effects may be evident. First, additional urea may serve to shift the various equilibrium reactions toward the cyanamide ion, thereby stabilizing greater amounts of the acid cyanamide ion. As said before, the acid cyanamide ion may function to prevent loss of urea. Therefore, a second effect may be that acid cyanamide ions stabilize themselves by preventing loss of urea.

Another possible effect that may be operative in the compositions and methods according to the disclosure is that nitrogen containing material such as urea and manures appear to enhance dissolution of solid calcium cyanamide. In doing so, nitrogen containing materials apparently provide increased concentrations of acid cyanamide ions, more quickly, thereby leading to rapid stabilization of the nitrogen containing material at the urea stage. As noted already, stabilization of urea can synergistically lead to stabilization of acid cyanamide that helps to stabilize the urea.

The compositions and methods of the present invention satisfy the background needs and offer the desired advantages identified above. Generally, the disclosed compositions and methods provide for stabilization, controllable release, and enhanced efficiency of the components of commercial calcium cyanamide. When calcium cyanamide is combined according to the disclosure with nitrogen containing materials, co-activation and stabilization occurs, providing synergistic responses from the components of both the calcium cyanamide and of the nitrogen containing materials.

Disclosed herein is granular composition that includes about 0.1 to about 1.1% of the total weight as carbon black powder; about 0.1 to about 40% of the total weight as calcium cyanamide; and about 60 to about 99.9 percent of the total weight as urea. In embodiments, the carbon black powder, calcium cyanamide, and urea are homogeneously mixed.

In addition to the urea, in embodiments, the granular material further includes at least one additional nitrogen containing material. In certain examples, the at least one additional nitrogen containing material is an ammonium salt. In certain examples, the ammonium salt is selected from the group consisting of ammonium sulfate, ammonium chloride, ammonium monophosphate, ammonium diphosphate, ammonium citrate, ammonium nitrate, calcium ammonium phosphate, and mixtures thereof. In embodiments the granular composition includes at least one nitrogen containing compound selected from the group consisting of ammonium sulfate, ammonium chloride, ammonium monophosphate, ammonium diphosphate, ammonium citrate, ammonium nitrate, calcium ammonium phosphate, and mixtures thereof and at least one non-nitrogen plant nutrient selected from the group consisting of phosphorous, potassium, iron, copper, zinc, manganese, boron, magnesium, molybdenum, sulfur, and mixtures thereof.

In embodiments, the granular material further includes at least one non-nitrogen plant nutrient. In examples, where the non-nitrogen plant nutrient is selected from the group consisting of phosphorous, potassium, iron, copper, zinc, manganese, boron, magnesium, molybdenum, sulfur, and mixtures thereof.

Also disclosed is a method for making a homogeneous solid composition, comprising. In certain embodiments the method includes: dissolving urea in water, to create a urea and water solution; adding carbon black powder to the urea and water solution; combining calcium cyanamide with the urea and water solution where the amount of water in the solution is at least 14 times the weight of the dry calcium cyanamide; and dehydrating the solution to form a solid. In embodiments, the water is saturated with urea. In embodiments, the solution is a slurry.

Surprisingly, when aeration is inhibited, calcium cyanamide and urea may be directly added to one another according to these methods, without significant loss of nitrogen, to yield a highly active cocktail. The cocktail may be preserved by dehydration and may be reactivated at a desired time and place by adding water. Also surprisingly, if the nitrogen containing material is manure, adding calcium cyanamide and inhibiting aeration serves to promote rapid (for example, a few hours to few days) release of soluble nitrogen and other nutrients from organic matter.

As will be discussed subsequently, what is even more surprising is that rapid composting of manures and also odor and microorganism inhibition are observed even at very low calcium cyanamide percentages. For example, when aeration is inhibited, liquidized manure with only 0.2 percent of the manure weight in solid calcium cyanamide exhibits these characteristics.

Thus, the methods of the disclosure rely in part on the discovery that inhibiting aeration of aqueous solutions of calcium cyanamide helps preserve the initial dissolution and hydrolysis products of calcium cyanamide. Aeration of aqueous solutions of calcium cyanamide appears to lead to increased precipitation of soluble calcium ions as insoluble calcium carbonate and to a reduction in pH that favors molecular cyanamide over acid cyanamide ions. Inhibiting aeration counteracts this effect. Any method of inhibiting aeration or combinations thereof may be used and specific, non-limiting examples include the following.

Aeration may be inhibited by simple techniques that provide relatively shorter periods of preservation of the desirable dissolution and hydrolysis products. For example, degassed water (e.g., boiled water, water subject to a vacuum, or nitrogen purged water) may be used instead of water in equilibrium with the atmosphere. Minimizing the vigor of mixing to slow dissolution of atmospheric gases into the water is another simple measure that may provide temporary stabilization of the liberated components of calcium cyanamide.

Other methods of inhibiting aeration that may provide for more controllable and longer preservation include the use of closed containers to inhibit exchange of gases with the atmosphere. A narrow opening or a loose fitting closure for such containers will provide some limited inhibition of aeration. Tight fitting or sealed closures (e.g., with a gasket or o-ring) are more desirable because gas exchange with the atmosphere is substantially prevented. When aqueous calcium cyanamide compositions are prepared and stored in sealed containers, they may be stored almost indefinitely.

Evacuation of the gases overlying an aqueous calcium cyanamide composition is another method of inhibiting aeration. Conversely, a gas that serves to substantially exclude the atmosphere may be added to a container. A gas may be added even if there is no closure on the container, provided the gas forms a dense blanket (e.g. argon) or is added to provide for constant gas outflow through the opening of the container. If the container is sealed a pressurized gas may further serve to expel the contents of the container and deliver the highly active aqueous compositions of this disclosure.

In particular embodiments, the gas may be selected from the group consisting of nitrogen, ammonia, argon, and mixtures thereof. Thus, surprisingly, when calcium cyanamide compositions are mixed with water (in at least 14× excess by weight relative to the calcium cyanamide content), in a container that is quickly sealed, a self-stabilizing highly active cocktail is obtained without any additional effort or additives. Furthermore, buffered by the calcium carbide gas, the resulting cocktail which contains only finely divided carbon rather than calcium carbonate balls and clumps may be sprayed, either directly or by injection into a chemigation/fertigation apparatus, without clogging.

Homogeneous granular materials according to the disclosure are also provided by a method of melting together a mixture of urea, carbon black, and calcium cyanamide, and then prilling, granulating, or spraying the melted mixture onto a seed particle to form a granule. In some embodiments, the seed particle is a particle of urea and in others, the seed particle is a particle of calcium cyanamide. The mixture of urea and calcium cyanamide and/or the seed particle may further comprise at least one additional ingredient, selected from the group consisting of nitrogen containing materials, non-nitrogen plant nutrients, and mixtures thereof.

In embodiments, at least one additional nitrogen containing compound is included in the solution. In embodiments, at least one additional non-nitrogen plant nutrient is included in the solution.

Also disclosed is method for providing nutrients to plants. The method includes: providing a disclosed granular composition; adding water to the granular composition to form an aqueous composition; and applying the aqueous composition to a plants to provide nutrients to plants.

In a particular embodiment, the calcium cyanamide is commercial calcium cyanamide and it is added to at least 14× its weight in water. The aqueous composition may be utilized as a sprayable slurry or optionally, solids may be removed from the aqueous composition before it is applied. Solids may be removed, for example, from the aqueous composition by a method selected from the group consisting of filtration, centrifugation, and decantation.

If urea or animal excreta are added to aeration inhibited aqueous compositions comprising a calcium containing compound, the synergistic soil amending action of soluble calcium and urea may provide improved delivery of all the nutrients in the composition. In various embodiments, urea may be added in an amount from about 0.01 percent by weight of the composition to about its saturation limit in the aqueous composition. Additional urea may be added if a slurry containing urea particles is desired.

In another alternative embodiment, aeration of aqueous calcium compound containing compositions is inhibited until the compositions are added to additional water and applied to plants, soils, or mediums through an irrigation system, for example a fertigation/nitrigation system.

Also disclosed is a method for enhancing plant growth. The method includes: providing a disclosed granular composition; adding water to the granular composition to form an aqueous composition; and applying the aqueous composition to enhance plant growth. In more particular embodiments, aeration of the aqueous composition is inhibited until the aqueous composition is applied to enhance plant growth.

The following examples are provided to illustrate certain particular features and/or embodiments. These examples should not be construed to limit the disclosure to the particular features or embodiments described.

EXAMPLES

Example 1

Homogeneous Compositions

It is possible to produce homogenous granules having virtually any ratio of calcium cyanamide to urea, and carbon black ratios. These material can be made using the apparatus illustrated in FIG. 1. Such heterogeneous compositions can include calcium cyanamide in ranges from about 0.1% by weight to less than about 30% by weight, more preferably from about 0.1% to less than about 20% by weight, even more preferably from about 0.1% to less than about 10% by weight, and typically less than about 5%, and the balance being nitrogen-containing materials, such as urea mixed with about 0.1% to about 1.1% carbon black, and any other material that may be chosen to make useful compositions.

Compositions having relatively low amounts of calcium cyanamide are preferred for agricultural applications, while granules having relatively high ratios of calcium cyanamide-to-urea are desired to improve the handling, shipping, and storing properties of the calcium cyanamide. It is possible to include other plant fertilizing materials, nutrients and soil amendments in embodiments of the compositions of the present invention. Other plant fertilizers, nutrients and soil amendments include, but are not limited to, phosphorous, potassium, iron, copper, zinc, manganese, sulfur, boron, magnesium, molybdenum, and mixtures thereof. A more exhaustive list of plant nutrients, including micronutrients, is found in the official publication of the Association of American Plant Food Control Officials (AAPFCO), volume 53, 2000, which is incorporated herein by reference.

For the solid compositions, additional plant nutrients and soil amendments may be added to the calcium cyanamide phase, the nitrogen fertilizer phase, or both phases. The solid compositions may also include additional coatings, such as urea-formaldehyde to further enhance the mechanical strength. The compositions may also have additional hydrophobic layers, such as parafinnic hydrocarbons or sulfur, to slow the dissolution of the solid compositions. Other nitrogen-containing compounds may be substituted for the urea as a coating. Examples of other suitable nitrogen containing compounds include manure, organics including composted materials, ammonium sulfate and ammonium phosphate. Additional nitrogen containing compounds useful for forming calcium cyanamide/nitrogen fertilizer granules can be found in the official publication of the AAPFCO. It is also possible to produce homogeneous solid compositions by dehydrating the any of the liquid compositions according to the disclosure.

Figure 1:
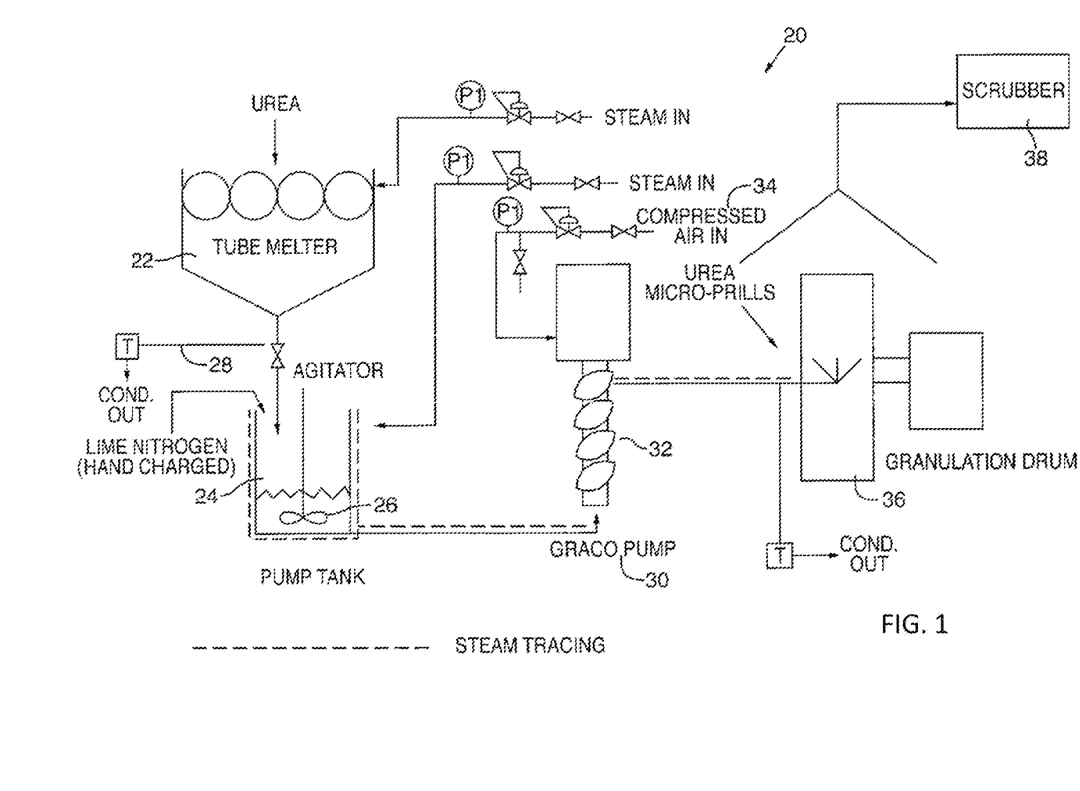
FIG. 1 is a schematic diagram of an apparatus used to make particular granular embodiments of compositions comprising a nitrogen-containing materials, such as carbon black, urea, and calcium cyanamide.

Homogeneous granules are formed in a manner similar to the granules of Example 1 except that they were formed around a small "seed" of urea. About 768 grams of feed-grade urea prill were fed to stainless steel tube melter 22 at 55-60 psig. Melter 22 was heated to about 305° F. to ensure that the urea melted within 30 seconds to avoid unwanted biuret production. The melt was collected in a pump tank 24 fitted with a variable speed agitator 26. Any condensate produced was discharged through a gas outlet 28. A valve (not shown) regulates the flow of urea. Powdered calcium cyanamide was hand fed into the pump tank 26 and agitated to prevent settling while it mixed with the urea melt.

Several different compositions are made, including 1% and 5% by weight calcium cyanamide/urea. The pump 30 operated with compressed air and provided a stream of urea+calcium cyanamide through jacketed stainless steel conduits 32 to the pan granulator 36. The pump 30 is set to increase the pressure from 20 psig to from about 200 psig to about 300 psig. The pan granulator 36 includes lifting flights mounted 1.5 inches apart inside the drum to provide a curtain of granules to which the homogenous mixture comprising molten urea and calcium cyanamide is applied. The drum is mounted on a variable speed base (not shown) and the drum speed was kept at 35-40 rpm. Approximately 2 pounds of industrial grade urea prills as "seed" are tumbled in the drum granulation drum 36 for about 40 to 50 revolutions as urea and calcium cyanamide are sprayed into the drum. The temperature of the spray is kept at about 210° F., and particularly below about 220° F., to prevent the formation of fine particles of dust-like urea. A hydraulic nozzle and 200-mesh stainless steel strainer are used to provide the molten solution at from about 200 psig to about 300 psig. A scrubber 38 is used to remove escaping fine particles. The resultant product is sieved through a plurality of screens to obtain a Tyler screen value of −6, +12. Other nitrogen-containing compounds can be substituted for the urea.

Example 2

Using Compositions Comprising Calcium Cyanamide

The methods and the compositions disclosed herein can be used for a variety of purposes. These include agricultural uses, such as fertilizing and/or soil amending compositions, as well as for disinfecting and controlling odors of certain materials, including fertilizing and/or waste materials, such as, without limitation, human waste effluents, livestock manure and waste effluents, garbage, oils, plant materials, such as vegetable waste, and paper processing materials. While not limiting the present invention to a particular theory of operation, it is believed that the disclosed synergistic compositions in use derive their efficacy in large part from a stabilization of the bioactive acid cyanamide ion and soluble calcium such as provided by calcium cyanamide and $CaO/Ca(OH)_2$. In addition, as described further below, the efficacy of the synergistic compositions may derive from the discovery of the ability of these compositions to enhance soil permeability and allow percolation of the bioactive cyanamide ion and soluble calcium ions into plants at or above ground level and deep into the soil for root uptake.

Using the methods for using and compositions described herein as fertilizing and soil amending compositions, or as odor-controlling and disinfecting compositions, typically comprises (1) forming the compositions, and (2) applying the compositions to various materials and/or locations, such as odiferous materials, particularly human and animal wastes and fluids, slaughterhouse wastes, or agricultural plots. The compositions are formed as described above. Once formed, the compositions can be applied to odiferous materials and/or agricultural plots by any suitable method, including by hand or using conventional spraying or irrigation techniques. The compositions of the present invention can be applied either as solid materials or as aqueous dispersions, including both suspensions and filtered solutions. For example, heterogeneous and/or homogeneous compositions may be made as described above and then applied to agricultural plots as solid materials. Alternatively, the compositions may be added to an aqueous solvent, decanted and/or filtered as desired, and thereafter applied to agricultural plots, such as by using conventional spraying and irrigation injection devices. The method of the present invention provides a distinct advantage in that spraying devices can conveniently be used without the heretofore ubiquitous clogging problems associated with using the conventional, substantially pure fine particles of calcium cyanamide. This not only avoids problems associated with clogging apparatuses, but also reduces the toxicity exposure problems noted in the Background section for persons handling the compositions.

Example 3

Using Compositions Comprising Calcium Cyanamide, Urea and Carbon Black

Figure 2:
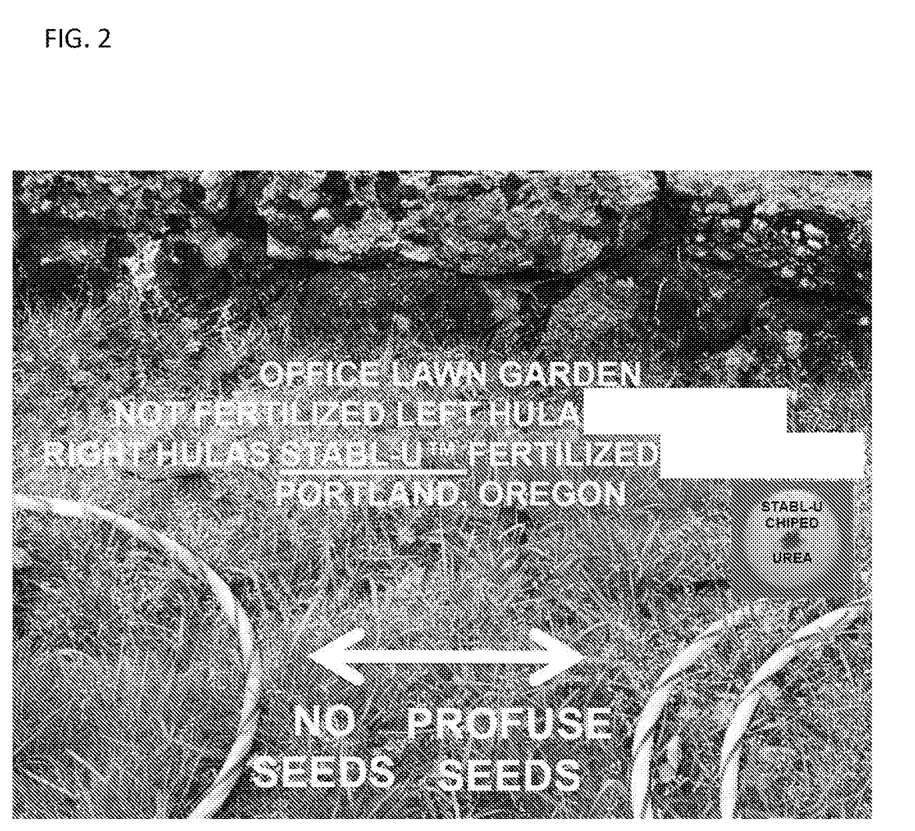
FIG. 2 is a digital image showing plant growth.
Figure 3:
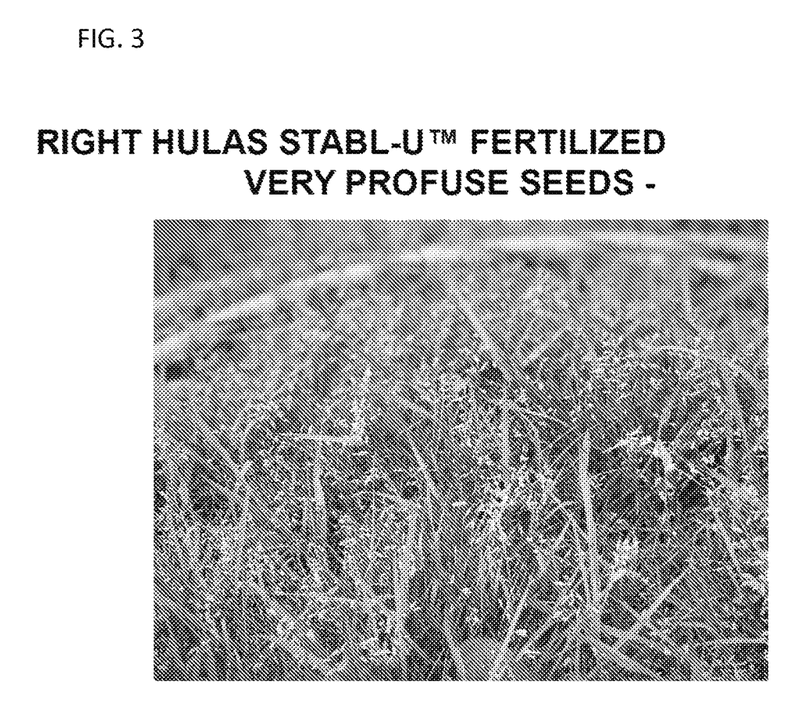
FIG. 3 is a digital image showing plant growth.
Figure 4:
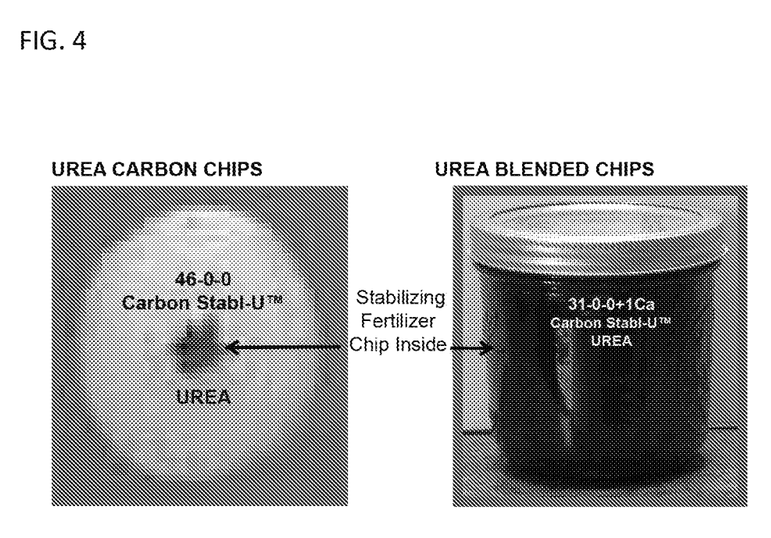
FIG. 4 is a set of digital images showing a granular and blended liquid material that includes carbon black powder, calcium cyanamide, and urea.

With reference to FIGS. 2 and 3 the single Hula not fertilized—Double Hulas same day fertilized with carbon chip inside urea granules. The expectation was vegetative growth only. However, unexpectedly very profuse initial desired reproductive exposure occurred.

| | |
|---|---|
| UNTREATED - Reproduction flowers with seeds | 1% |
| UNTREATED New Vegetative Growth (leaves) | 0%-None |
| TREATED - Reproduction flowers with seeds | 85% |
| TREATED New Vegetative Growth (leaves) | 35% |

Example 4

Greenhouse Rice Test

This test was conducted to compare the use of Chip Urea and Black Chip Urea to the use of ordinary granular urea for growing rice. Chip Urea, Black Chip Urea, and plain urea fertilizers were tested at Applied Chemical Technology to fertilize rice grown in 5-gallon buckets in a greenhouse. The rice was fertilized following practices used to grow rice commercially in Arkansas. These practices include fertilizing with starter fertilizers and then dry seeding the rice. Nitrogen is then applied at flooding and again when the plants enter the reproductive phase. The fertilizer is flooded into the soil when the rice plants reach the 4-leaf stage by applying the granular fertilizer to the surface and then the applying the floodwater.

Greenhouse

The rice for the tests was grown in a climate controlled greenhouse. This greenhouse had an evaporative cooling system that was set to come on at 80° F. The rice was grown in five gallons buckets that were placed on a table in the greenhouse. Each fertilizer was tested with five replicates placed randomly on the table. The codes for labeling the tests are given in Example 5. The bucket placement for the tests is shown in Example 6.

Soil Preparation

Top soil was purchased from Shoals Dirt near Florence, Ala. This soil was mixed and sieved using a 3 MG screen. Soil samples were taken and sent for testing to the University of Arkansas. Each five gallon bucket was filled with 39 pounds of soil and placed on the greenhouse table with no space between the buckets.

Based on the soil test results, each bucket received pre-fertilizer that included urea, triple super phosphate (TSP), potassium chloride, Epsom salts (magnesium sulfate heptahydrate), and zinc sulfate.

The TSP fertilizer was applied first. This was done by weighing out 3.58 g of TSP for each bucket and then mixing the TSP thoroughly into the top 3-4 inches of soil.

Next, the remaining starter fertilizer was applied to each bucket by making a solution of the urea, potassium chloride, zinc sulfate, and Epson salts according to the values presented in Table A of Example 5. This solution was made so that the amount of the solution needed to supply the correct amount of each nutrient to each bucket was found in 200 mL of the solution. The 200 mL of solution was then evenly poured over the surface of the soil in each bucket.

Planting and Care Until Flooding

The pre-fertilizer was applied. The rice was then planted by placing 10-15 seeds on the surface of the soil and using a pencil to push the rice seed ¾ inch beneath the soil surface. The hole was filled with sand. After planting, the soil moisture was monitored. If the buckets needed to be watered, then all of the buckets are watered with the same amount of water by volume. For all of the watering throughout the tests, rain water was used. At any given watering, all of the buckets were watered from a single container to ensure that all of the buckets got the same ingredients from the rainwater.

Once all of the buckets had at least 5 plants at the four leaf stage, the plants were thinned to five healthy plants in each bucket, and it was time for fertilizer placement and flooding.

Fertilizing the Rice

Approximately 2 and ½ weeks later, 70% of the soil recommended nitrogen was applied in the form of either Chip Urea, Black Chip Urea, or plain urea granules. The fertilizer was spread over the soil surface, and the soil was then flooded with rain water until the water stood approximately ¼"-½" above the soil surface. After the flood waters were applied, they were gradually increased every other day until the depth reached 2-3 inches.

The fertilizers used were products made at ACT in the pilot plant tests. The urea used was standard U.S. granular urea. The amounts of each fertilizer were based on the nitrogen measured in the fertilizer by LECO so that every bucket received the same amount of nitrogen. Table B of Example 5 shows the nitrogen levels measured in each fertilizer as well as the amount of fertilizer applied to each bucket both at flooding and at the reproductive stage. The final 30% of the nitrogen that was placed at the reproductive stage was put in the floodwaters approximately six weeks after planting.

Care after Fertilizing

Once the flood depth was been raised to 2-3 inches deep, the level was maintained throughout the rest of the growing season. The plants in the greenhouse were checked daily to ensure that no pests or disease threatened their health. Spider mites were found during the growth so insecticide was sprayed regularly to control them.

Harvest and Measurements

Twice during the test, the relative chlorophyll in the leaves was measured using a SPAD 501 meter. The first measurement was taken on July 19 and the second was taken on September 21 which was the Friday before harvest. To measure the chlorophyll, 30 readings were taken in each bucket and the average of the readings recorded. These measurements are given in Example 7.

After harvest, the rice panicles were placed in a 50° C. oven to dry for two days. The rough rice was then separated from the stems and the dry weight was recorded. The average of these dry weights are presented in Example 7.

Conclusions

The average chlorophyll measurements (Example 7) taken approximately 8 weeks after planting showed a slight elevation in the chlorophyll measurements of the leaves of the buckets grown with black chip urea and chip urea.

However, just before harvest the average chlorophyll measurements for all of the tests were the same.

The average yield per bucket for both the rice grown with chip urea and black chip urea were higher than the average yield per bucket for rice grown with plain urea. The average yield per bucket for the chip urea was 6.5% more than the average yield per bucket for the plain urea. The black chip urea produced an even greater increase in yield of 10.8% over the plain urea indicating that the use of carbon black with the chip urea improves the yield even more than without the carbon black. This unexplained increase in yield with carbon black is surprising. ACT recommends talking with your patent attorney before sharing this information with anyone.

Example 5

Test Container Labels and Fertilizer Amounts for Rice 1 Tests

The tests codes used for labeling the Rice 1 (R1) tests are shown below. In the codes, the R1.CU.#—Rice 1 Tests Using Chip Urea R1.BU.#—Rice 1 Tests Using Black Chip Urea R1.U.#—Rice 1 Tests Using Plain Urea

TABLE A

Pre-Fertilizer Weights:

|  | Per 4000 mL | Per Bucket |
| --- | --- | --- |
| Triple Super Phosphate (g) | N/A | 3.58 g |
| Muriate of Potash (g) | 55.18 | 2.76 |
| Urea (g) | 10.00 | 0.50 |
| ZnSO$_4$•7H$_2$O (g) | 20.80 | 1.04 |
| Epsom Salt (g) | 332.0 | 16.6 |
| Boric Acid (g) | 0.330 | 0.0165 |
| CuSO$_4$•5 H$_2$O (g) | 4.40 | 0.220 |

TABLE B

Weights of Fertilizers Applied per Bucket

| Test Label | BE.R1.CU | BE.R1.BU | BE.R1.U |
| --- | --- | --- | --- |
| % N in Fertilizer | 44.79% | 44.45% | 46.37% |
| Weight of Fertilizer Applied at Flooding (g) | 1.85 | 1.87 | 1.79 |
| Weight of Fertilizer Applied at 52 days after planting (g) | 0.80 | 0.80 | 0.77 |
| Weight of N per Bucket (g) | 1.19 | 1.19 | 1.19 |

Example 6

| Placement of Buckets on Table for Tests South | | | | |
|---|---|---|---|---|
| R1.CU.1 | R1.U.2 | R1.CU.3 | R1.BCU.4 | R1.U.5 |
| R1.U.1 | R1.BCU.2 | R1.U.3 | R1.CU.5 | R1.CU.2 |
| R1.BCU.1 | R1.CU.4 | R1.BCU.3 | R1.U.4 | R1.BCU.5 |

Example 7

Chlorophyll Measurements and Yields

TABLE C

Average of Chlorophyll Measurements

| | Date of Measurement | |
|---|---|---|
| | July 19 | September 21 |
| Average for Urea | 46.8 | 36.4 |
| Average for Chip Urea | 48.4 | 36.2 |
| Average for Black Chip Urea | 47.1 | 36.5 |

TABLE D

Average Rough Rice Yield per Bucket

| | Average Dry Weight at Harvest (g) | % Increase in Yield |
|---|---|---|
| Black Chip Urea | 71.38 | 10.8% |
| Chip Urea | 68.62 | 6.5% |
| Urea | 64.42 | 0.0% |

The present invention has been described with reference to certain embodiments. The scope of the invention should not be limited to these embodiments, but rather should be determined by reference to the attached claims.

We claim:

1. A granular material, comprising:
 about 0.1 to about 1.1% of the total weight as carbon black powder;
 about 0.1 to about 40% of the total weight as calcium cyanamide; and
 about 60 to about 99.9 percent of the total weight as urea.

2. The granular material of claim 1, wherein the carbon black powder, calcium cyanamide, and urea are homogeneously mixed.

3. The granular material of claim 1, further comprising at least one additional nitrogen containing material.

4. The granular material of claim 3, wherein the at least one additional nitrogen containing material is an ammonium salt.

5. The granular material of claim 4, wherein the ammonium salt is selected from the group consisting of ammonium sulfate, ammonium chloride, ammonium monophosphate, ammonium diphosphate, ammonium citrate, ammonium nitrate, calcium ammonium phosphate, and mixtures thereof.

6. The granular material according to claim 1, further comprising at least one non-nitrogen plant nutrient.

7. The granular material of claim 6, wherein the non-nitrogen plant nutrient is selected from the group consisting of phosphorous, potassium, iron, copper, zinc, manganese, boron, magnesium, molybdenum, sulfur, and mixtures thereof.

8. The granular material of according to claim 1, wherein the composition further comprises at least one nitrogen containing compound selected from the group consisting of ammonium sulfate, ammonium chloride, ammonium monophosphate, ammonium diphosphate, ammonium citrate, ammonium nitrate, calcium ammonium phosphate, and mixtures thereof and at least one non-nitrogen plant nutrient selected from the group consisting of phosphorous, potassium, iron, copper, zinc, manganese, boron, magnesium, molybdenum, sulfur, and mixtures thereof.

9. A method for providing nutrients to plants, comprising:
 providing the granular composition of claim 1;
 adding water to the granular composition to form an aqueous composition; and
 applying the aqueous composition to plants to provide nutrients to the plants.

10. A method for enhancing plant growth, comprising:
 providing the granular composition of claim 1;
 adding water to the granular composition to form an aqueous composition; and
 applying the aqueous composition to plants to enhance plant growth.

11. A method for making a homogeneous solid composition, comprising:
 dissolving urea in water, to create a urea and water solution;
 adding carbon black powder to the urea and water solution;
 combining calcium cyanamide with the urea and water solution where the amount of water in the solution is at least 14 times the weight of the dry calcium cyanamide; and
 dehydrating the solution to form a solid.

12. The method of claim 11, wherein the water is saturated with urea.

13. The method of claim 11, wherein the solution is a slurry.

14. The method of claim 11, further comprising inhibiting the aeration of the solution.

15. The method of claim 14, wherein inhibiting aeration comprises combining and dehydrating within a container that inhibits exchange of gases with the atmosphere.

16. The method of claim 15, wherein the container is sealed to substantially prevent exchange of gases with the atmosphere.

17. The method of claim 15, wherein the container is evacuated to inhibit exchange of gases with the atmosphere.

18. The method of claim 15, wherein inhibiting aeration comprises combining and granulating in the presence of a gas that serves to substantially exclude the atmosphere.

19. The method of claim 18, wherein the gas is selected from the group consisting of nitrogen, ammonia, argon, and mixtures thereof.

20. The method of claim 19, wherein at least one additional nitrogen containing compound is included in the solution.

21. The method of claim 11, wherein at least one additional non-nitrogen plant nutrient is included in the solution.

22. A method for making a solid composition, comprising:
 providing a calcium cyanamide core;
 coating the calcium cyanamide core with urea to form a calcium cyanamide core with a urea shell; and
 coating the urea shell with a carbon black shell.

23. The method of claim 22, wherein coating the calcium cyanamide core with urea, comprises
   dissolving urea in water, to create a urea and water solution; and
   allowing the urea to harden around the calcium cyanamide core.

24. The method of claim 23, wherein allowing the urea harden comprises dehydrating the urea.

25. The method of claim 22, wherein coating the urea shell with a carbon black shell, comprises
   combining carbon black powder with a urea and water solution; and
   allowing the carbon black powder urea and water solution to harden around the urea shell.

26. The method of claim 23, wherein allowing the carbon black powder urea and water solution to harden comprises dehydrating the solution.

27. The method of claim 22, further comprising including at least one additional nitrogen containing compound in the solid composition.

28. The method of claim 22, further comprising including at least one additional non-nitrogen plant nutrient is included in the solution.

\* \* \* \* \*